United States Patent

[11] 3,579,277

| [72] | Inventor | Issei Imahashi<br>Suwa-shi, Japan |
|---|---|---|
| [21] | Appl. No. | 820,200 |
| [22] | Filed | Apr. 29, 1969 |
| [45] | Patented | May 18, 1971 |
| [73] | Assignee | Kabushiki Kaisha Suwa Seikosha |
| [32] | Priority | Apr. 30, 1968 |
| [33] | | Japan |
| [31] | | 43/28687 |

[54] BRUSHLESS DIRECT CURRENT MOTOR
5 Claims, 6 Drawing Figs.

[52] U.S. Cl.................................................. 310/156,
310/68
[51] Int. Cl....................................................H02k 21/00
[50] Field of Search.......................................... 310/156,
49, 137, 138, 139, 68 (.2), 177, 91, 180, 181, 185,
268; 318/138, 171, 254, 474

[56] References Cited
UNITED STATES PATENTS
| 3,284,687 | 11/1966 | Schlenker..................... | 318/138 |
| 3,290,572 | 12/1966 | Hartmann..................... | 318/138 |
| 3,317,803 | 5/1967 | Ikegami........................ | 318/138 |
| 3,364,407 | 1/1968 | Hill............................... | 318/138 |
| 3,402,333 | 9/1968 | Hayner.......................... | 310/49 |
| 3,453,512 | 7/1969 | Polakowski................... | 318/138 |

Primary Examiner—Milton O. Hirshfield
Assistant Examiner—R. Skudy
Attorney—Blum, Moscovitz, Friedman & Kaplan ABSTRACT: In brushless direct current motors having pairs of axially spaced permanent magnets radially arranged about and fixed to a rotor shaft, driving coils disposed in the space between said pairs of permanent magnets and detecting means including detecting coils, and a shield ring having cutaway portions in the path of said detecting coil for the operation of each detecting coil when said cutaway portions are aligned therewith for the activation of the driving coil associated with said detecting coil; the improvement of mounting the driving coils in apertures in an insulated board at an angular interval of about 100° and forming said board with a notch extending from the edge thereof to the center of said driving coils to permit removal of said rotor shaft.

Patented May 18, 1971 3,579,277

BRUSHLESS DIRECT CURRENT MOTOR

BACKGROUND OF THE INVENTION

This invention relates generally to brushless direct current motors adapted for operation in connection with transistorized driving circuits. Many forms of such direct current motors have been proposed but they all suffer from the disadvantages of not being self-starting and of failing to consistently rotate the motor thereof in a predetermined direction. One proposed approach to overcome these difficulties is the provision of a hall effect sensing element but the cost of such elements is extremely high. By providing a proper alignment of driving coils and detecting arrangement as taught in the copending application of Chifumi Komatsu for "Brushless Direct Current Motor," assigned to the assignee herein, the foregoing defects have been avoided while providing a brushless direct current motor of relatively low cost. Still further efficiencies in compactness and economy can be achieved by the proper mounting of the elements as taught herein.

Generally speaking, a brushless direct current motor may be provided which includes pairs of axially spaced permanent magnets radially arranged about and fixed relative to a rotor shaft. Driving coils are disposed in the space between said pairs of permanent magnets and a detecting means having detecting coils is also provided. At least one detecting coil is provided for each driving coil, the number thereof preferably equaling one-half of the number of pairs of permanent magnets provided. The driving coils are radially arranged about said rotor shaft so that, at any position of said permanent magnets, at least one of said driving coils is positioned with each of two sides thereof within the gap between different pairs of permanent magnets, said different pairs of permanent magnets being aligned to produce a force on said rotor shaft in the same direction. Further, said detecting means is disposed so that the detecting coils associated with at least one of the driving coils aligned to produce a force on said rotor shaft is activated.

The detecting means preferably includes a plurality of pairs of axially spaced detecting coils spaced about said rotor shaft and a conducting shield plate mounted for rotation with said rotor shaft and extending into the space between said detecting coils, said shield plate being formed with portions cut away to permit activation, at any position of said shield plate of at least the detecting coil associated with at least one of the driving coils aligned to produce a driving force at that position.

In the improvement in accordance with the invention, the driving coils are supported in apertures formed in a planar base made of insulating material. The coils are disposed on the base at an angular interval of about 100° about said rotor shaft. The base is provided with a notch extending from one edge thereof to the center of the three coils, said notch being adapted to receive said rotor shaft and to permit the insertion and removal thereof. Further, the detecting coils are disposed at an angular interval of 40 degrees about said rotor shaft.

Accordingly, it is an object of this invention to provide a brushless direct current motor which can be readily assembled and disassembled.

Another object of the invention is to provide a brushless direct current motor which is self starting, always rotates in the predetermined direction, and is of extremely simple construction and relatively low cost.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
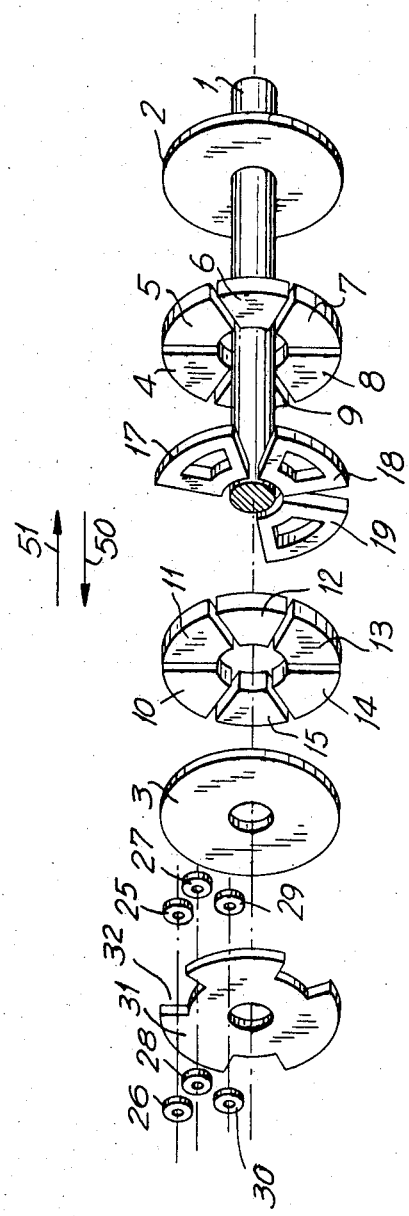
FIG. 1 is an exploded perspective view of a brushless direct current motor according to the invention.
Figure 6:
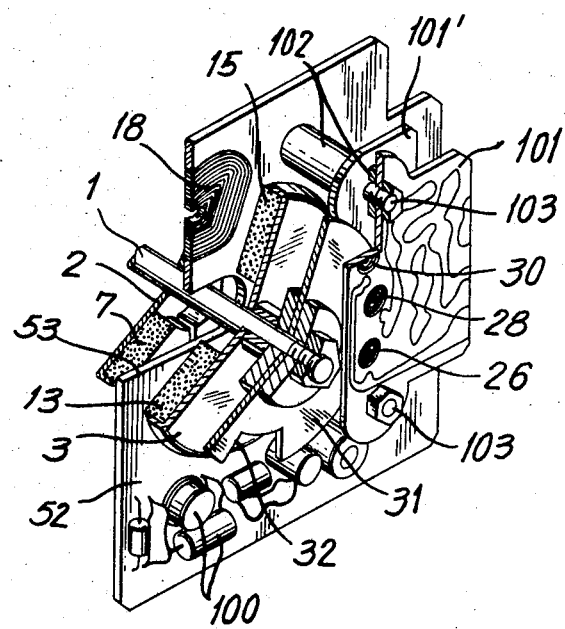
FIG. 6 is a perspective view of the assembled brushless direct current motor of FIG. 1 with portions broken away.

Referring now to FIG. 1, the direct current brushless motor shown is exploded along the axis of rotor shaft 1 thereof away from yoke 2. When assembled as shown in FIG. 6, yokes 2 and 3 are mounted on shaft 1 in spaced relation. Arranged radially about shaft 1 are pairs of permanent magnets 4 and 10, 5 and 11, 6 and 12, 7 and 13, 8 and 14, and 9 and 15. One of each of said pairs of permanent magnets, namely magnets 4, 5, 6, 7, 8 and 9, are fixedly secured to yoke 2, while the other of said permanent magnets are fixedly secured to yoke 3. Each of said permanent magnets is sector shaped, defining a sector of an arc about shaft 1. Each of said pairs of permanent magnets are in spaced relation and disposed with opposite poles in facing relation. Thus, the south pole of magnet 7 faces the north pole of magnet 13. Further, the six poles secured to each yoke and disposed so that adjacent magnets have their opposite poles facing the airgap between said pairs of permanent magnets to produce a magnetic field in said gap. Thus, permanent magnet 4 has its north pole facing the airgap and its companion permanent magnet 10, while the adjacent permanent magnets 9 and 5 both have their south poles facing said airgap and their respective companion magnets. By this arrangement, the magnetic fields between pairs 4 and 10, 6 and 12 and 8 and 14 extend in the direction of arrow 50 while the fields between pairs 5 and 11, 7 and 13 and 9 and 15 extend in the direction of arrow 51.

Figure 2:
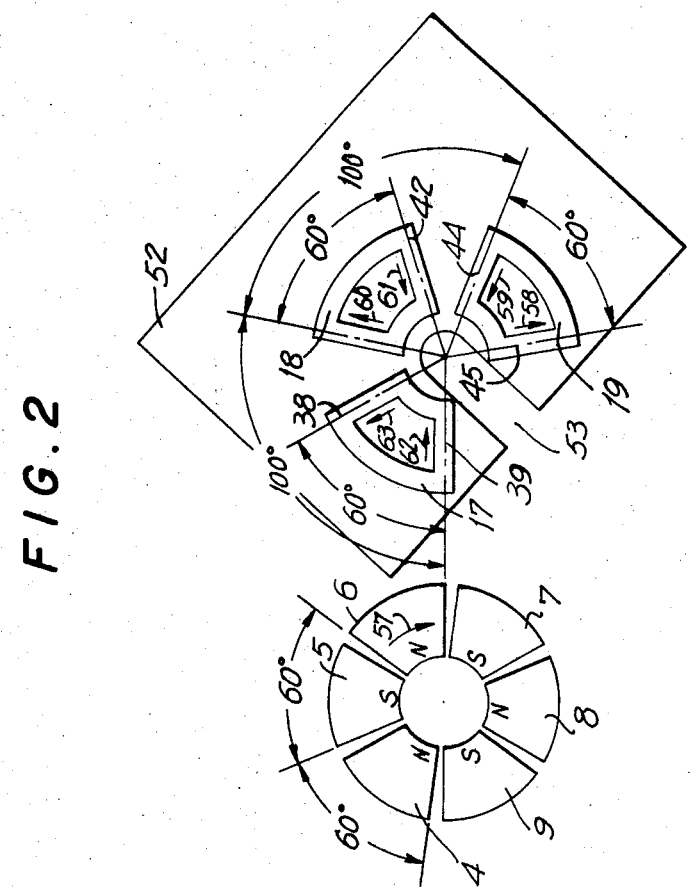
FIG. 2 shows an enlarged exploded view of the driving coils and permanent magnets of the motor of FIG. 1.

Disposed in the airgap between said pairs of permanent magnets are substantially trapezoidal flat driving coils 17, 18 and 19. Said driving coils are radially arranged about rotor shaft 1 but are mounted independently thereof in apertures in a base 52 of insulating material as more particularly shown in FIGS. 2 and 6. The permanent magnets are circumferentially distributed about shaft 1 at equal intervals of 60 degrees. The three driving coils 17, 18 and 19 are mounted on base 52 at a circumferential interval of 100° about said shaft. Further, said driving coils are arranged so that the angles defined between the centerlines of sides 38 and 39 of coil 17, sides 41 and 42 of coil 18 and sides 44 and 45 of coil 19 all equal 60°. Also as shown in FIG. 2, base 52 is provided with a notch 53 extending from one edge thereof to the center of said driving coils, said notch being adapted to accommodate rotor shaft 1 during normal operation and for the insertion and removal thereof. Also mounted on base 52 are electronic circuit elements 100 such as transistors, resistors and capacitors defining the circuitry associated with the driving coils.

Figure 3:
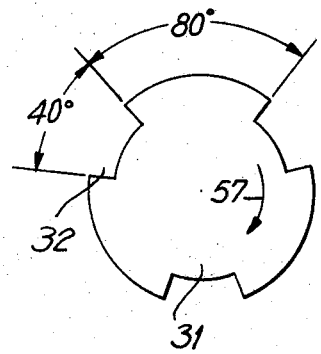
FIG. 3 is a top plan view of the shield plate of the motor of FIG. 1.
Figure 4:
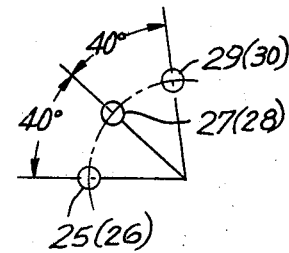
FIG. 4 is a top plan view of the detecting coils of the motor according to FIG. 1.

Also provided is a detecting means consisting of three pairs of detecting coils 25 and 26, 27 and 28, and 29 and 30, as more particularly shown in FIG. 4. Said detecting coils are preferably formed in the shape of small discs with the detecting coils forming each pair being disposed in spaced relation with an airgap therebetween. Said pairs of detecting coils are disposed radially about rotor shaft 1 with an angle of 40° being defined between pairs 25 (26) and 27 (28), and 29 (30), respectively. As shown in FIG. 6, detecting coils 26, 28 and 30 are mounted on circuit board 101 while detecting coils 25, 27 and 29, not shown in FIG. 6, are mounted on circuit board 101'. Circuit boards 101 and 101' are mounted in spaced relation to each other and to base 52 by spacers 102 mounted on bolts 103. Said detecting means also includes a shield plate 31 as shown in FIG. 3 fixedly mounted to rotor shaft 1 and extending into the gap between said pairs of detecting coils. The shield plate is formed with three cutaway regions 32 within the path of said detector coil airgaps. Said cutaway regions are spaced equally radially about rotor shaft 1, each of said openings defining a 40° sector. Shield plate 31 is preferably formed from a material of low electric resistance, such as aluminum.

Figure 5:
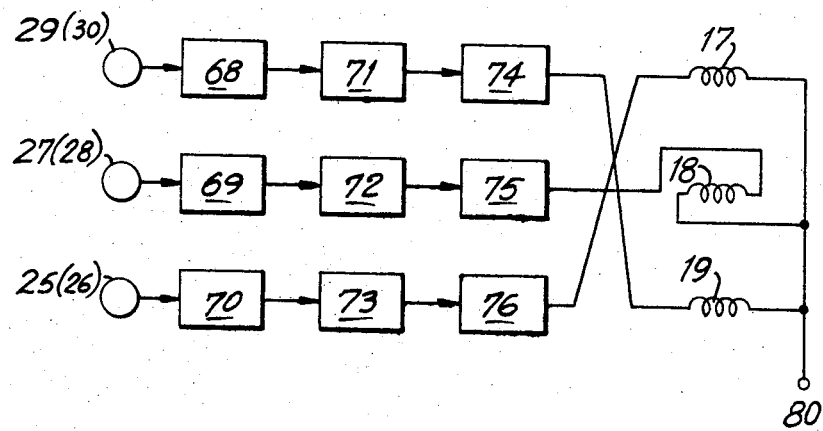
FIG. 5 is a block diagram showing the driving circuit for the motor of FIG. 1.

Referring now to FIG. 5, the driving circuits of the motor according to the invention as shown. Each driving circuit consists of a oscillator 68, 69 and 70, a demodulating circuit 71, 72 and 73 for rectifying the output of the oscillators and a power amplifier 74, 75 and 76 for applying a driving current to the corresponding driving coils. One of the pairs of detecting coils is connected to each oscillator circuit to govern the oscillation thereof while a corresponding driving coil is connected to the output of the power amplifiers.

Referring now to FIGS. 1—4, the operation of the motor according to the invention is explained as follows. When the cutaway portion of 32 shield plate 31 positioned opposite detecting coils 27 (28), the oscillator 69 connected to this coil commences oscillation. The oscillating wave is demodulated by demodulator 72, amplified by power amplifier 75 to apply driving current through driving coil 18. When the current flows through said driving coil in the direction of arrows 60 and 61, the side 41 of said driving coil acts on the pair of permanent magnets 5 and 11, while the side 42 thereof acts on the pair of permanent magnets 6 and 12, to produce a force in the direction of arrow 57 in accordance with the normal laws of magnetic fields. Accordingly, the whole rotor assembly including shield disc 31 rotates in the direction of said arrow 57.

When rotor shaft 1 has rotated about 40° in the direction of arrow 57, shield plate 31 is interposed between the pair of detecting coils 27 and 28 to stop the oscillation of oscillator 69. During the above-described period, shield plate 31 was interposed between the other pairs of detecting coils to prevent the oscillation of oscillator 68 and 70. However, at the moment that oscillator 69 stops operation, cutaway region 32 is disposed opposite detecting coils 29 (30) causing oscillator 68 to commence operation to apply driving current to coil 19. When the current flows through driving coil 19 in the direction of arrows 58 and 59, the side 45 of said driving coil acts on the pair of permanent magnets 7 and 13 while the side 44 acts on the pair of permanent magnets 6 and 12 to apply a force to the rotor assembly to continue the rotation thereof in the direction of arrow 57. Of course, the rotation of shaft 1 carries with it yokes 2 and 3, the permanent magnets, and shield disc 31. This portion of the cycle continues while the rotor rotates 40° until shield plate 31 is interposed between detecting coils 29 (30) while cutaway region 32 is disposed opposite detecting coils 25 (26) to apply a driving current to driving coil 17. When the current flows through coil 17 in the direction of arrows 62 and 63, the side 39 of said coil acts on the pair of permanent magnets 8 and 14, while the side 38 acts on the pair of permanent magnets 9 and 14 to produce a continued rotative force in the direction of arrow 57.

The above-described cycle is repeated with every 120° rotation of the rotor shaft with the detecting coils and driving coils being sequentially activated to continuously rotate the rotor shaft in a predetermined direction.

Driving coils 17, 18 and 19 may be disposed in a variety of positions. Thus, the following chart represents some examples of the angular displacement at which driving coils 18 and 19 may be disposed relative to driving coils 17.

| Driving | |
|---|---|
| 18 | 19 |
| 40 degrees. | 20 degrees. |
| 100 degrees. | 80 degrees. |
| 160 degrees. | 140 degrees. |
| 220 degrees. | 200 degrees. |
| 280 degrees. | 260 degrees. |
| 340 degrees. | 320 degrees. |

However, it has been found that by disposing the coils at an interval of 100,° a device which is readily assembled and manufactured is produced. This results from the fact that the driving coils are not stacked one upon another and that notch 53 can be provided in base 52 to permit the insertion and removal of rotor shaft 1. The latter embodiment, which is pictured in the drawings has driving coil 18 disposed at 100° relative to driving coil 17, and driving coil 19 disposed at 200° relative to driving coil 17, thereby producing the 100° interval between corresponding radial edges of adjacent driving coils.

In addition, there are a variety of arrangements for the detecting coils according to the invention but, by disposing said detecting coils at an interval of 40° on one side of the device, a simple mounting arrangement may be provided as shown in FIG. 6.

By arranging the motor according to the invention in the preferred manner, a motor is produced which is inexpensive to produce and operate while being extremely compact.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

I claim:

1. In a direct current brushless motor having a rotor shaft, a pair of spaced yokes mounted on said shaft for rotation therewith, a plurality of pairs of permanent magnets radially arranged about said shaft between said yokes, one of each of said pairs of permanent magnets being mounted on each of said yokes with a gap therebetween, a plurality of driving coils disposed in the gap between said pairs of permanent magnets, and a detecting means responsive to the position of said rotor shaft and having at least one detecting coil associated with each driving coil for the activation of said driving coil to rotate said rotor shaft, the improvement which comprises providing three nonoverlapping driving coils having corresponding radial edges thereof circumferentially spaced about said shaft at an angular interval of about 100°, said motor including a base having said three driving coils mounted thereon, said base being formed with a notch extending from one edge thereof to the center of said driving coils, said notch being adapted to receive said motor shaft during the operation of said motor and to permit the displacement of said rotor shaft therealong.

2. A direct current brushless motor as recited in claim 1, wherein said detecting means includes a shield ring on said shaft formed from a conducting material and having cutaway portions in the path of said detecting coils to permit the operation of each of said detecting coils when said cutaway portions are aligned therewith for the activation of the associated driving coil to rotate said rotor shaft.

3. A brushless direct current motor as recited in claim 2, wherein the poles of each pair of permanent magnets defining the gap therebetween are of opposite polarity to produce a magnetic field in said gap and the poles of adjacent permanent magnets on each of said yokes are of different polarity, said motor being provided with six pairs of permanent magnets circumferentially spaced about said rotor so that each of said pairs of permanent magnets substantially occupies a 60° sector, each of said driving coils substantially occupying a 60° sector.

4. A direct current brushless motor as recited in claim 2, wherein said shield ring has a plurality of cutaway portions in the path of said detecting coils each permitting the operation of a detecting coil when said cutaway portion is aligned therewith for the activation of the driving coil associated with said detecting coil, said detecting coils being spaced circumferentially about the rotor shaft at 40° intervals, each of said cutaway portions defining a 40° circumferential arc about said rotor shaft.

5. A direct current brushless motor as recited in claim 4, wherein said motor is provided with three sets of detecting coils, said shield ring being provided with three cutaway regions equally spaced about said rotor shaft.